No. 859,117. PATENTED JULY 2, 1907.
C. W. SAGEE.
GLASS SHEARING DEVICE.
APPLICATION FILED DEC. 4, 1905.
2 SHEETS—SHEET 1.
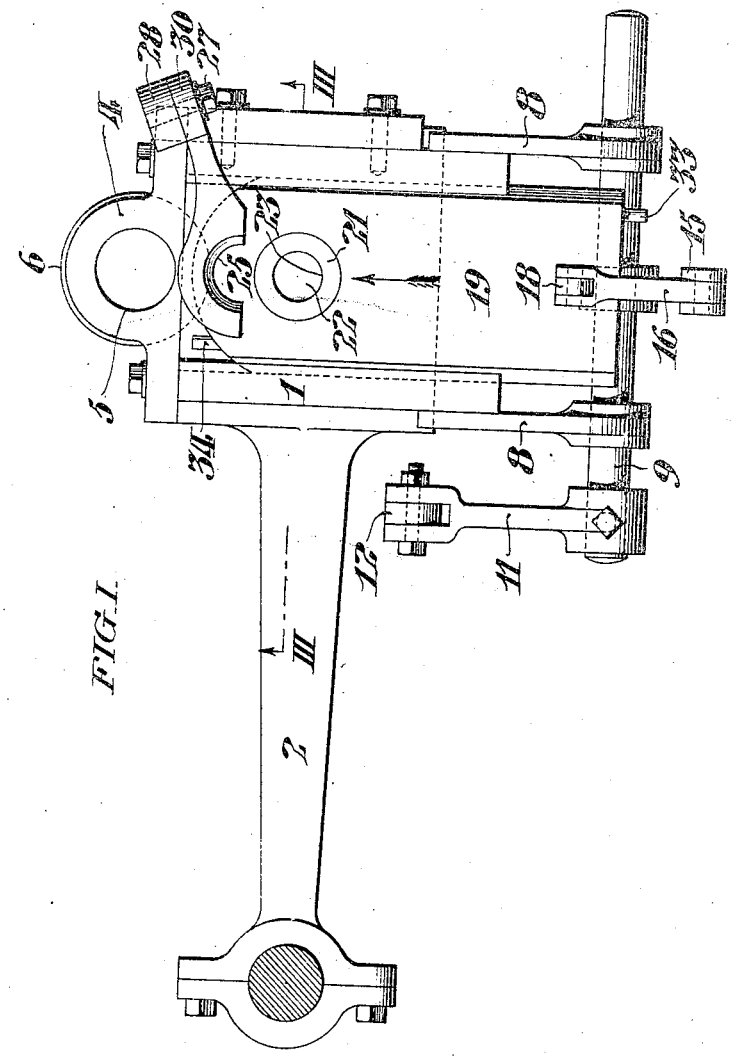
FIG. I.
WITNESSES:
Clifton C. Hallowell
John C. Bergner
INVENTOR
CHARLES W. SAGEE,
by Paige, Paul & Foley
Attys No. 859,117. PATENTED JULY 2, 1907.
C. W. SAGEE.
GLASS SHEARING DEVICE.
APPLICATION FILED DEC. 4, 1905.
2 SHEETS—SHEET 2.
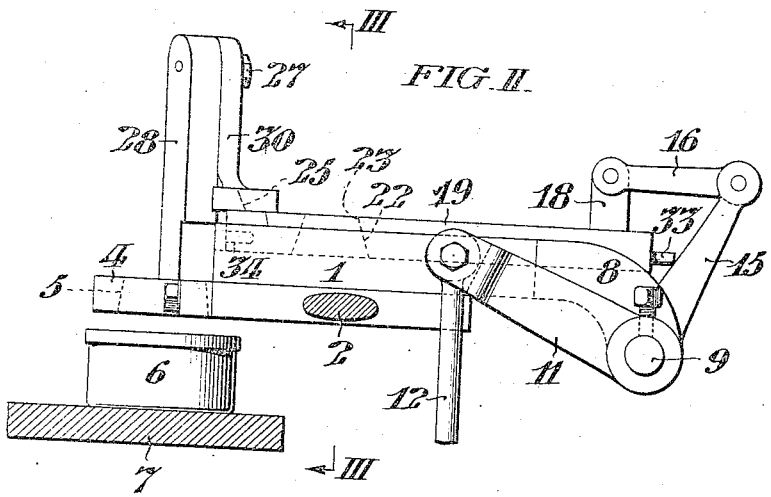
FIG. II.
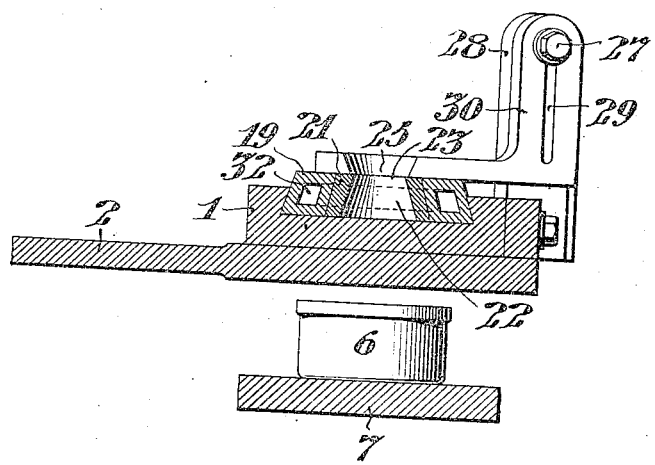
FIG. III.
WITNESSES:
Clifton C. Hallowell
John C. Bergner
INVENTOR:
CHARLES W. SAGEE,

UNITED STATES PATENT OFFICE.

CHARLES W. SAGEE, OF PHILADELPHIA, PENNSYLVANIA.

GLASS-SHEARING DEVICE.

No. 859,117.  Specification of Letters Patent.  Patented July 2, 1907.

Application filed December 4, 1905. Serial No. 290,061.

*To all whom it may concern:*

Be it known that I, CHARLES W. SAGEE, of Philadelphia, in the county of Philadelphia and State of Pennsylvania, have invented certain new and useful Improvements in Glass-Shearing Devices, whereof the following is a specification, reference being had to the accompanying drawings.

It is the object of my invention to provide an attachment for a glass forming machine, adapted to automatically shear molten glass and supply the same to a mold or molds comprised in said machine.

The form of my invention hereinafter described comprises a frame adapted to be secured in stationary relation with the glass forming machine, and a shearing slide plate mounted to reciprocate in said frame in such relation with the operation of said glass forming machine as to shear and deposit the glass in proper relation with the molds utilized in said machine.

My invention comprehends the various novel features of construction and arrangement hereinafter more definitely specified and claimed.

In the accompanying drawings, Figure I, is a plan view showing a convenient embodiment of my invention. Fig. II, is an elevation of the left hand side of the device, shown in Fig. I. Fig. III, is a sectional view taken on the line III, III, in Figs. I and II.

In said figures, 1, is the frame which is conveniently provided with the arm 2, for stationary engagement with the standard of the glass forming machine, to which said frame is thus secured so that the guide plate 4, has its opening 5, in concentric relation with the mold 6, supported by the member 7, of said machine. Said frame 1, is provided at its opposite end with brackets 8, which support the rock shaft 9, which is provided with the arm 11, which may be conveniently connected by the rod 12, so as to be operated in definite relation to the operation of said glass forming machine. Said shaft 9, is provided with the arm 15, between said brackets 8, which is connected by the link 16, with the boss 18, on the shearing slide plate 19, which is arranged to reciprocate in said frame 1, being retained therein by the opposite overhanging edges of said frame, as indicated in Fig. III. Said plate 19, carries the bushing 21, comprising the truncated conical receptacle 22, so as to sweep its upper shear edge 23, beneath and in shearing relation with the stationary shear blade 25, which overhangs said plate 19, and is adjustably supported in stationary relation therewith by the bolt 27, extending from the standard 28, through the slot 29, in the shank 30, of said blade.

As indicated in Fig. III, the slide 19, is preferably chambered, as indicated at 32, so as to receive a cooling medium which may be conveniently directed therethrough by the inlet 33, and outlet 34. It is to be understood that said inlet and outlet may be connected by flexible tubes with a supply of cooling medium, for instance, water.

The device above described, operates as follows:—A gather of glass is lowered into the receptacle 22, and the slide 19, is shifted in the direction of the arrow marked thereon in Fig. I, so as to carry the bushing 21, past the blade 25, so as to shear from the gather by the co-operation of the shear edge 23, of the bushing and the blade 25, sufficient glass to charge the receptacle 22, the gather being supported during the operation by said blade 25. Further traverse of the slide plate 19, presents said bushing 21, in registry with the opening 5, in said guide plate 4, so that the charge of glass is dropped from the receptacle 22, into the mold 6, which mold is thereupon shifted to the position where it may be subjected to the pressing operation.

I do not desire to limit myself to the precise details of construction and arrangement herein set forth, as it is obvious that various modifications may be made therein, without departing from the essential features of my invention.

I claim:—

1. In a glass shearing device, the combination with a reciprocatory slide plate, having a glass receptacle opening therethrough; of a frame comprising slideways engaging said plate; a stationary shearing blade overhanging said plate in operative relation therewith; and, means arranged to reciprocate said plate in said frame, comprising a rock shaft; a lever arm; and, a link connecting said lever arm with said plate, substantially as set forth.

2. In a glass shearing device, the combination with a reciprocatory slide plate, having a glass receptacle opening therethrough; of a frame comprising slideways engaging said plate; a stationary shearing blade overhanging said plate in operative relation therewith; and, means adjustably connecting said blade with said frame, comprising a shank on said blade provided with a slot; and a bolt entered through said slot, substantially as set forth.

3. In a glass shearing device, the combination with a stationary frame; of a shearing slide plate arranged to reciprocate in said frame; a glass receptacle in said plate having a shearing edge at the top thereof; a stationary blade supported by said frame, overhanging said plate in coöperative relation with said shearing edge; and, means whereby said plate is presented with the glass receptacle remote from said blade to receive the glass, and then reciprocated in coöperative relation with said blade to shear the glass, substantially as set forth.

4. In a glass shearing device, the combination with a stationary frame; of a shearing slide plate arranged to reciprocate in said frame; a bushing in said plate, comprising a truncated conical receptacle having a shearing edge at its top; a shear blade above said plate; and, means whereby said plate is reciprocated in coöperative relation with said shear blade, substantially as set forth.

5. In a glass shearing device, the combination with a stationary frame; of a shearing slide plate arranged to reciprocate in said frame; a bushing in said plate, comprising a truncated conical receptacle having a shearing edge at its top; and a chamber in said plate surrounding said bushing; means to direct a cooling medium through said chamber; a shear blade above said plate; and, means whereby said plate is reciprocated in coöperative relation with said shear blade, substantially as set forth.

In testimony whereof, I have hereunto signed my name at Philadelphia, Pennsylvania, this first day of December 1905.

CHARLES W. SAGEE.

Witnesses:
EDW. L. TAYLOR,
F. M. BROWER.